(12) United States Patent
Cheng et al.

(10) Patent No.: US 9,432,375 B2
(45) Date of Patent: Aug. 30, 2016

(54) TRUST/VALUE/RISK-BASED ACCESS CONTROL POLICY

(71) Applicant: International Business Machines Corporation, Armonk, NY (US)

(72) Inventors: Pau-Chen Cheng, Yorktown Heights, NY (US); Lawrence Koved, Pleasantville, NY (US); Kapil K. Singh, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 14/281,955

(22) Filed: May 20, 2014

(65) Prior Publication Data

US 2015/0106888 A1 Apr. 16, 2015

Related U.S. Application Data

(60) Provisional application No. 61/889,310, filed on Oct. 10, 2013.

(51) Int. Cl.
*G06F 21/00* (2013.01)
*H04L 29/06* (2006.01)
*G06F 21/45* (2013.01)
*G06F 21/62* (2013.01)

(52) U.S. Cl.
CPC ............. *H04L 63/10* (2013.01); *G06F 21/45* (2013.01); *G06F 21/62* (2013.01); *H04L 63/102* (2013.01)

(58) Field of Classification Search
CPC ...... G06F 21/30; G06F 21/31; G06F 21/316; G06F 21/34; G06F 21/45
See application file for complete search history.

(56) References Cited

U.S. PATENT DOCUMENTS

| | | | |
|---|---|---|---|
| 7,530,110 B2 | 5/2009 | Cheng et al. | |
| 8,099,781 B2 | 1/2012 | Anderson et al. | |
| 8,132,259 B2 | 3/2012 | Anderson et al. | |
| 8,276,192 B2 | 9/2012 | Anderson et al. | |
| 2011/0035788 A1* | 2/2011 | White | G06F 21/32 726/4 |
| 2012/0060207 A1 | 3/2012 | Mardikar et al. | |
| 2012/0066739 A1 | 3/2012 | Rissanen | |
| 2013/0081105 A1 | 3/2013 | Giambiagi | |
| 2013/0232542 A1 | 9/2013 | Cheng et al. | |
| 2013/0232543 A1 | 9/2013 | Cheng et al. | |

FOREIGN PATENT DOCUMENTS

WO 2008141327 A1 11/2008

OTHER PUBLICATIONS

Diep et al., "Contextual Risk-Based Access Control," Proceedings of the 2007 International Conference on Security & Management, (SAM 2007), Jun. 2007, pp. 406-412.
Diep et al., "Enforcing Access Control Using Risk Assessment," Proceedings of the Fourth European Conference on Universal Multiservice Networks (ECUMN'07), Feb. 2007, pp. 419-424.
Wrona et al., "Context-aware security and secure context-awareness in ubiquitous computing environments," XXI Autumn Meeting of Polish Information Processing Society Conference Proceedings, Dec. 2005, pp. 255-265.

* cited by examiner

*Primary Examiner* — Edward Zee
(74) *Attorney, Agent, or Firm* — Yee & Associates, P.C.; Jeffrey S. LaBaw

(57) ABSTRACT

Generating a resource access control decision is provided. A user trust value associated with a user identifier of a user requesting access to a protected resource is modulated based on an estimated risk value associated with a context of a resource access request. The resource access control decision is generated based on the modulated user trust value associated with the user requesting access to the protected resource.

20 Claims, 7 Drawing Sheets

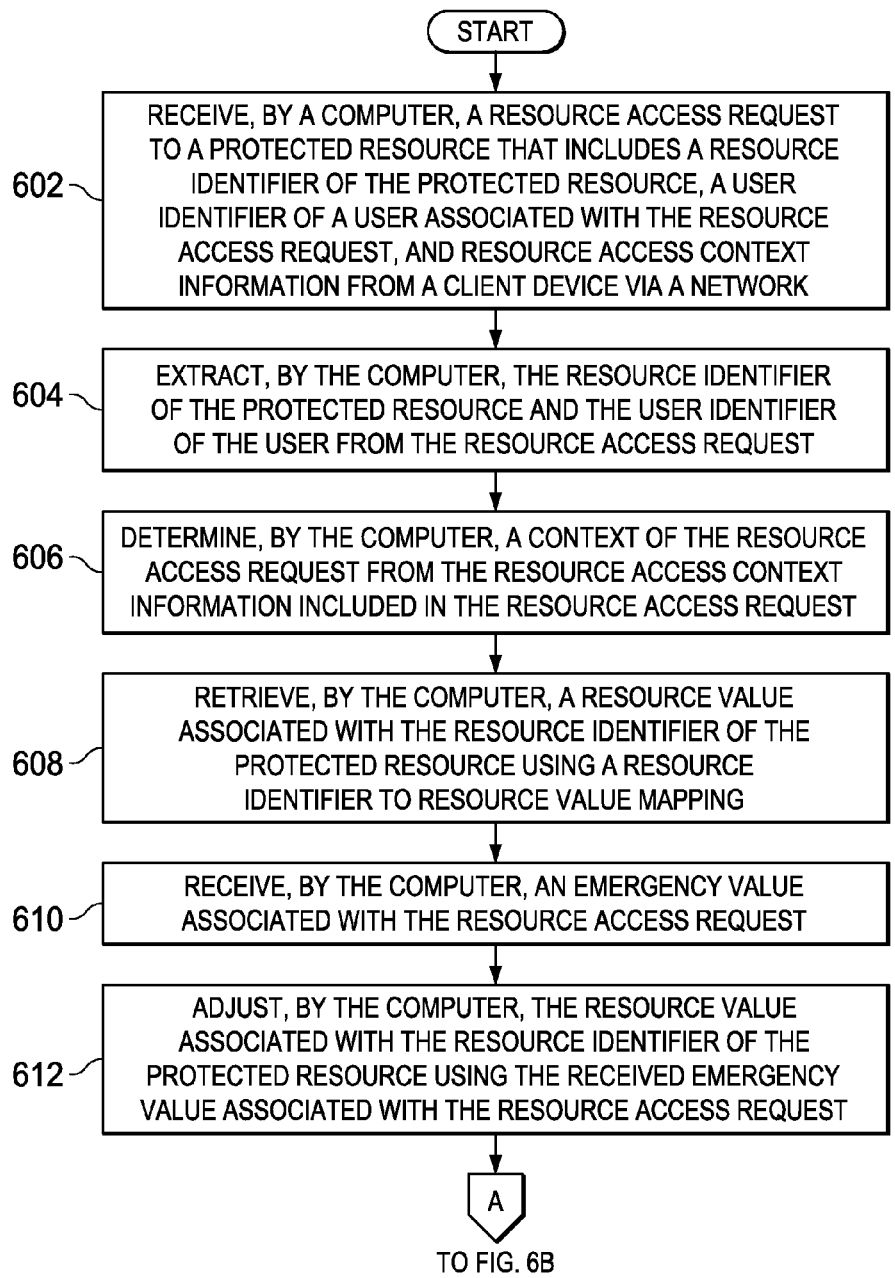

TRUST/VALUE/RISK-BASED ACCESS CONTROL POLICY

This application claims the benefit of U.S. Provisional Application 61/889,310, filed Oct. 10, 2013.

This invention was made with Government support under Contract No.: FA8750-12-C-0265 (U.S. Department of Homeland Security). The Government has certain rights in this invention.

BACKGROUND

1. Field

The disclosure relates generally to resource access control policies and more specifically to generating a resource access control decision based on an adjusted resource value associated with a protected resource and a modulated user trust value associated with a user requesting access to the protected resource.

2. Description of the Related Art

Traditional resource access control policies are rigid and inflexible. This inflexibility results in many exceptions being granted to allow legitimate resource access requests to proceed. To address this inflexibility issue, risk-based access control (RBA) policies were introduced to provide a controlled flexibility in resource access control by taking calculated risks, which are prohibited by the traditional access control policies.

SUMMARY

According to one illustrative embodiment, a computer-implemented method for generating a resource access control decision is provided. A computer modulates a user trust value associated with a user identifier of a user requesting access to a protected resource based on an estimated risk value associated with a context of a resource access request. The computer generates the resource access control decision based on the modulated user trust value associated with the user requesting access to the protected resource. According to other illustrative embodiments, a computer system and a computer program product for generating a resource access control decision are provided.

BRIEF DESCRIPTION OF THE SEVERAL VIEWS OF THE DRAWINGS

FIGS. 6A-6B are a flowchart illustrating a process for managing access control of a protected resource in accordance with an illustrative embodiment.

DETAILED DESCRIPTION

Figure 1:
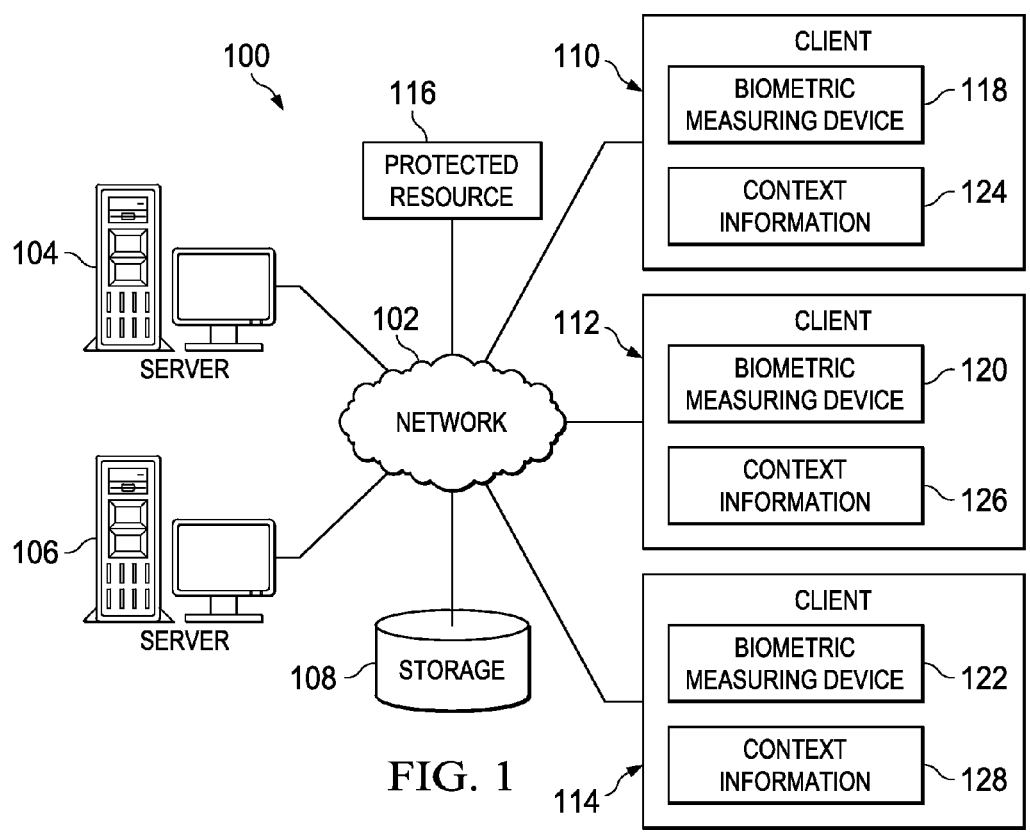
FIG. 1 is a pictorial representation of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
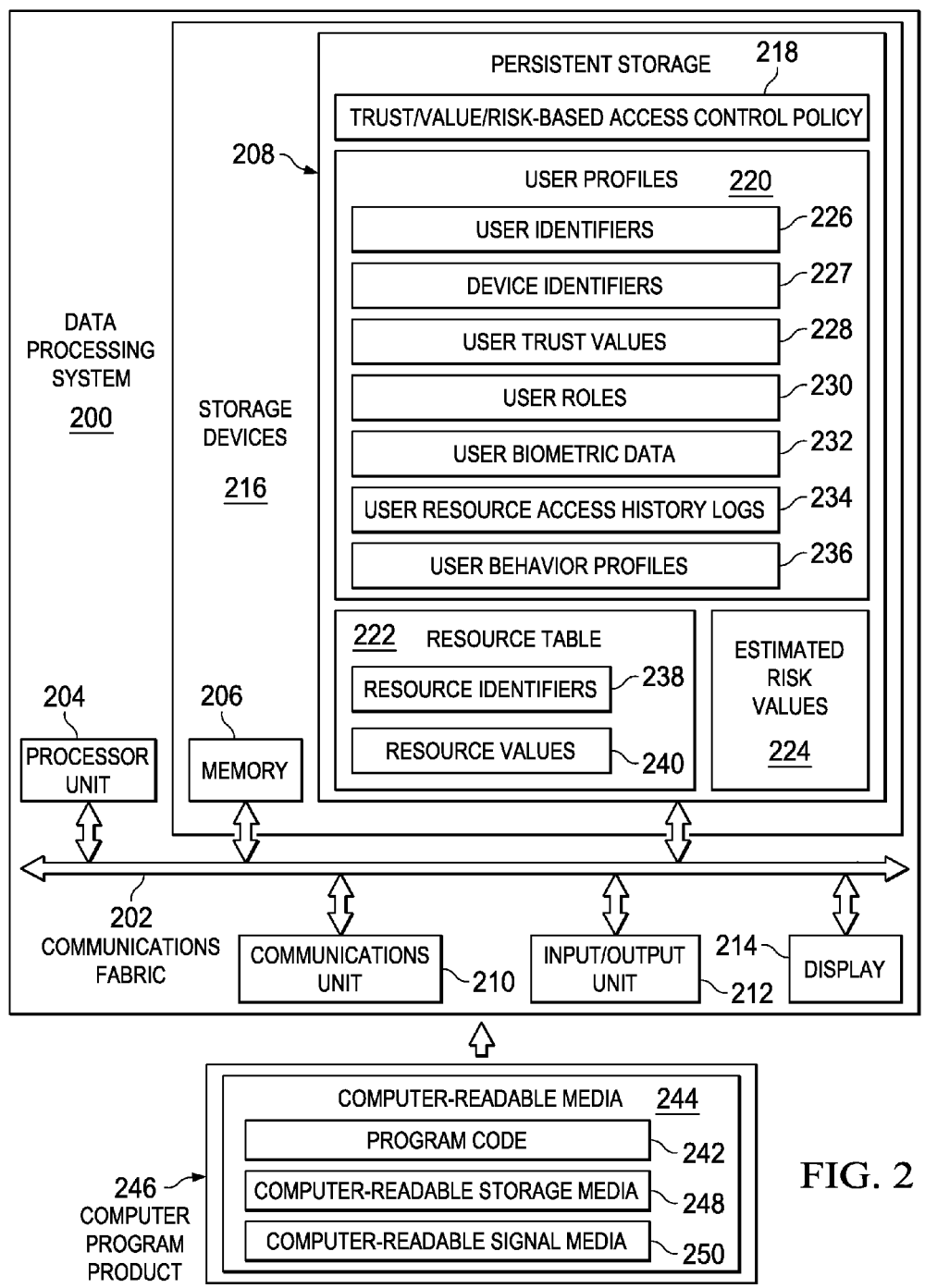
FIG. 2 is a diagram of a data processing system in which illustrative embodiments may be implemented.
Figure 3:
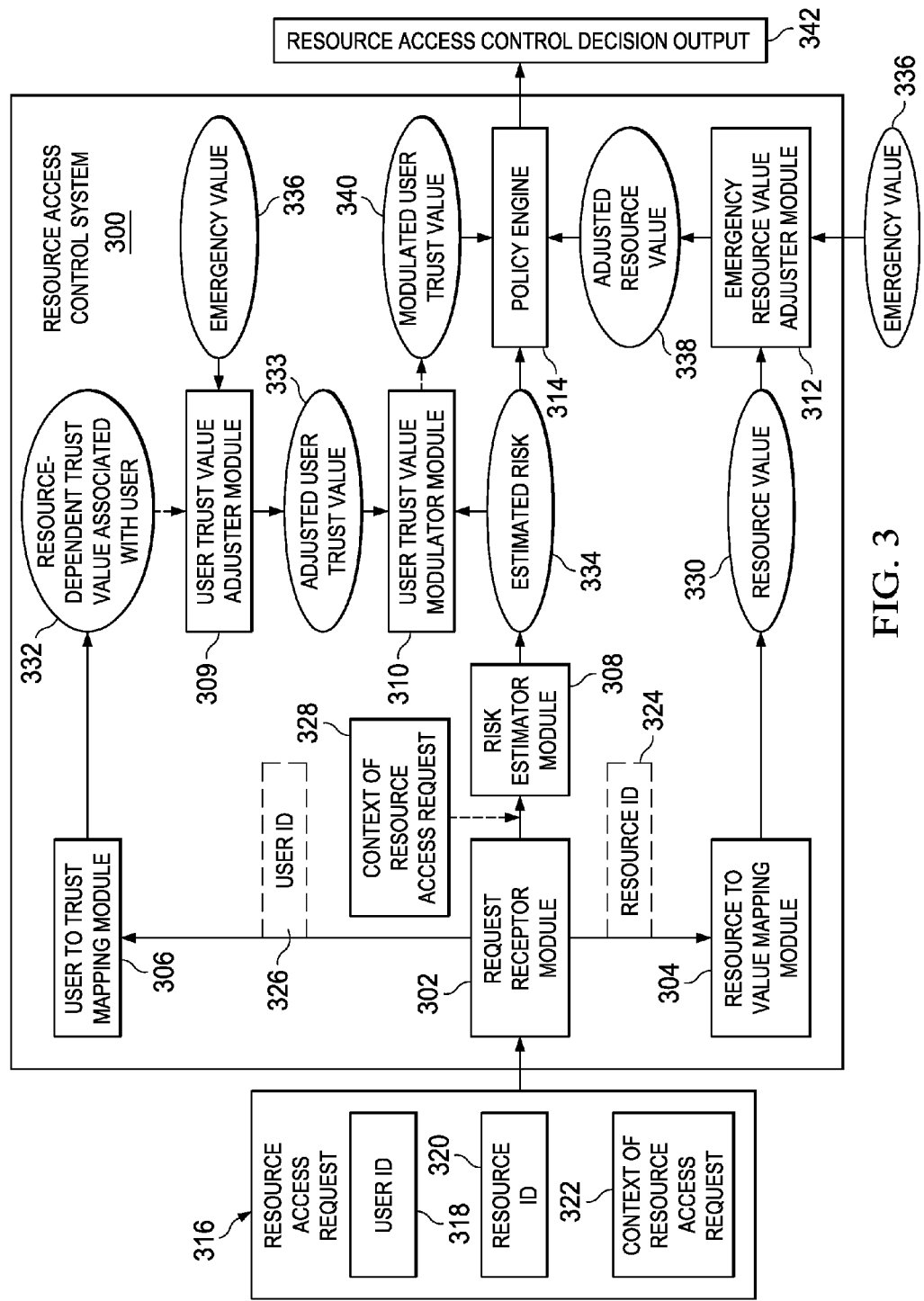
FIG. 3 is a diagram illustrating a resource access control system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and the other various devices connected together within network data processing system 100. Network 102 may include connections, such as wire communication links, wireless communication links, or fiber optic cables.

In the depicted example, server 104 and server 106 connect to network 102, along with storage unit 108. Server 104 and server 106 may be, for example, server computers with high speed connections to network 102. In addition, server 104 and/or server 106 may provide controlled access to protected resource 116, which also is connected to network 102.

Clients 110, 112, and 114 also connect to network 102. Clients 110, 112, and 114 are clients to server 104 and/or server 106. In the depicted example, server 104 and/or server 106 may provide information, such as boot files, operating system images, and applications to clients 110, 112, and 114. Users of clients 110, 112, and 114 may utilize clients 110, 112, and 114 to request and gain access to protected resource 116, which is protected by server 104 and/or server 106.

Clients 110, 112, and 114 may be, for example, personal computers, network computers, and/or portable computers, such as laptop computers, with wire communication links to network 102. In addition, clients 110, 112, and 114 may be mobile data processing systems, such as cellular telephones, smart phones, personal digital assistants, gaming devices, or handheld computers, with wireless communication links to network 102. It should be noted that clients 110, 112, and 114 may represent any combination of computers and mobile data processing systems connected to network 102.

In this example, clients 110, 112, and 114 include biometric measuring devices 118, 120, and 122, respectively. Clients 110, 112, and 114 may utilize biometric measuring devices 118, 120, and 122 to capture and record biometric data corresponding to users of clients 110, 112, and 114. Biometric measuring devices 118, 120, and 122 may include, for example, imaging devices, such as cameras, and/or sound capturing devices, such as microphones, to capture and record images of the user or voice recordings of the user. Clients 110, 112, and 114 may utilize the captured biometric data to authenticate a particular user of a particular client device. Further, clients 110, 112, and 114 may send the captured biometric data to server 104 or server 106 for user authentication prior to server 104 or server 106 allowing access to protected resource 116.

In addition, clients 110, 112, and 114 include context information 124, 126, and 128, respectively. Context information 124, 126, and 128 may be, for example, unique device identifiers and geographic location data regarding clients 110, 112, and 114. Clients 110, 112, and 114 may utilize the geographic location data to determine positioning of clients 110, 112, and 114 within a geographic area or building structure. The geographic location data may be provided by, for example, global positioning system (GPS) transceivers embedded within clients 110, 112, and 114. Clients 110, 112, and 114 may send context information 124, 126, and 128 to server 104 or server 106 for determining a context of an access request to protected resource 116 prior to allowing access to protected resource 116.

Protected resource 116 represents a set of one or more different protected resources. A protected resource may be, for example, a network, a document, a software application, or a hardware device in network data processing system 100 that has restricted access to only authorized users. An authorized user is a person that has permission to access protected resource 116. The permission to access protected resource 116 may be granted, for example, by a role assigned to the authorized user. A role may include a set of one or more assigned permissions to perform particular tasks or actions on one or more protected resources. A permission is a privilege or right to access a protected resource. The access privilege or access right may grant, for example, a user assigned to that particular access privilege or access right the ability to read, write, delete, and/or modify a protected document. As another example, the access privilege or access right may grant an assigned user the ability to access and use a secure hardware device, software application, or network, such as a secure computer, financial application, or storage area network.

Storage unit 108 is a network storage device capable of storing data in a structured or unstructured format. Storage unit 108 may provide storage of, for example: names and identification numbers of a plurality of different users; user trust values associated with each of the plurality of different users; user history data or access control logs for each of the plurality of different users, which may include listings of previously accessed protected resources, when the protected resources were accessed, and what actions were performed on the protected resources by the users; names and identification numbers of a plurality of different protected resources; and resource values associated with each of the plurality of different protected resources. Furthermore, storage unit 108 may store other data, such as authentication data that may include user names, passwords, and/or biometric data associated with each of the plurality of different users.

Also, it should be noted that network data processing system 100 may include any number of additional server devices, client devices, and other devices not shown. Program code located in network data processing system 100 may be stored on a computer readable storage medium and downloaded to a computer or other device for use. For example, program code may be stored on a computer readable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, an internet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device does not include a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard disk drive, a flash memory, a rewritable optical disk drive, a rewritable magnetic tape drive, or some combination of the above. The media used by persistent storage 208 may be removable. For example, a removable hard disk drive may be used for persistent storage 208.

In this example, persistent storage 208 stores trust/value/risk-based access control policy 218, user profiles 220, resource table 222, and estimated risk values 224. Of course, persistent storage 208 may store any type of information, data, program, or module utilized by the different illustrative embodiments.

Trust/value/risk-based access control policy 218 represents a set of one or more different trust/value/risk-based access control policies. A trust/value/risk-based access control policy separates a resource value associated with a protected resource, a user trust value associated with a user requesting access to the protected resource, and an estimated risk value associated with a context of the access request to the protected resource into three distinct components. For example, for an access request to a particular protected resource, data processing system 200 utilizes the corresponding risk, which data processing system 200 quantitatively estimates from context information contained within the access request, to modulate the user trust value associated with the user requesting access to the protect resource. Then, data processing system 200 utilizes the modulated user trust value and the resource value associated with the protected resource to generate a resource access control decision, such as, for example, grant access, mitigate access risk, or deny access, regarding the protected resource.

User profiles 220 represent a plurality of different user profiles that are associated with a plurality of different users. Data processing system 200 may associate each user in the plurality of different users with a set of one or more user profiles. User profiles 220 include user identifiers 226, user trust values 228, user roles 230, user biometric data 232, user resource access history logs 234, and user behavior profiles 236. However, it should be noted that user profiles 220 may include more or less data than shown. For example, user profiles may not include biometric data 232. Such embodiments may include profiling of device behavior, programs, application data, sensor data, historical data about any of these, and any other contextual information, available to or stored in the device, in any combination. Such profiles may be used to compute profiles of the users, groups or subsets of users within the plurality of users, the devices the users use of one or more device, in any combination thereof.

User identifiers 226 represent a plurality of different unique identifiers associated with the plurality of different users. Data processing system 200 may associate each user in the plurality of different users with a set of one or more user identifiers. A user identifier may be, for example, a unique user identification number, a unique user name, or a unique network address, such as an e-mail address. Data processing system 200 may utilize user identifiers 226 to uniquely identify each of the different users.

Device identifiers 227 represent a plurality of different unique identifiers associated with a plurality of different client devices. Data processing system 200 may associate each device in the plurality of different client devices with a set of one or more device identifiers. A device identifier may be, for example, a unique device identification number, a unique label, or a unique network address, such as an IEMI number. Data processing system 200 may utilize device identifiers 227 to uniquely identify each of the different client devices. In addition, data processing system 200 may associate each of the different users with one or more client devices. Also, data processing system 200 may associate one or more client devices with each of the different users.

User trust values 228 represent a plurality of different user trust values associated with the plurality of different users. Data processing system 200 may associate each user in the plurality of different users with a set of one or more trust values. A user trust value is a quantified level of trustworthiness corresponding to a particular user. Data processing system 200 may utilize user trust values 228 to determine the level of trustworthiness of the different users to access a protected resource, such as protected resource 116 in FIG. 1.

User roles 230 represent a plurality of different user roles associated with the plurality of different users. Data processing system 200 may associate each user in the plurality of different users with a set of one or more roles. A user role may include a set of one or more assigned permissions to access a set of one or more different protected resources. Data processing system 200 may utilizes user roles 230 to determine permissions assigned to each of the different users to access protected resources.

User biometric data 232 represent a plurality of different user biometric data associated with the plurality of different users. Data processing system 200 may associate each user in the plurality of different users with biometric data corresponding to each particular user. Biometric data may include, for example, a voice print, a facial image, a retinal image, a fingerprint, a hand print, a signature, or any combination thereof. Data processing system 200 may utilize user biometric data 232 to verify a user's identity prior to allowing access to a protected resource by the user. For example, data processing system 200 may receive biometric data corresponding to a particular user requesting access to a protected resource from a client device having a set of one or more biometric measuring devices, such as biometric measuring device 118 of client 110 in FIG. 1. Data processing system 200 may then compare the received biometric data corresponding to the particular user requesting access to the protected resource with stored user biometric data 232 to verify the particular user's identity prior to allowing access to the protected resource by that particular user. For a particular kind of biometrics data, such as voice print, the comparison of the received biometric data and the stored biometric data may generate a matching score indicating the degree of similarity between the received biometric data and the stored biometric data. The matching scores of different kinds of biometric data may be combined into an overall matching score. The process of generating and combining matching scores may be implemented on the server side as depicted in FIG. 2, but also may be implemented on the client side, such as on client 110, 112, or 114 in FIG. 1.

User resource access history logs 234 represent a plurality of different user resource access history logs associated with the plurality of different users. Data processing system 200 may associate each user in the plurality of different users with a set of one or more resource access history logs. A user resource access history log contains a record of each protected resource accessed by a particular user over a predetermined period of time, when the particular user accessed and exited the protected resources, and actions taken by the particular user while accessing the protected resources. A user resource access history log may include other information, such as, for example, an identification of a client device utilized by a particular user to access the protected resources and a geographic location of the client device while accessing the protected resources and other contextual information that may be used to further identify the user, the accessing device, and/or construct usage profiles used to assess the risk of resource access. The user resource access history log may be, for example, a first in/first out (FIFO) data table. Data processing system 200 may utilize user resource access history logs 234 to determine access patterns to protected resources by a particular user and/or device and to determine previous resource access permissions granted to the user based on any number of relevant contextual factors.

User behavior profiles 236 represent a plurality of different user behavior profiles associated with the plurality of different users. Data processing system 200 may associate each user in the plurality of different users with a set of one or more behavior profiles. A user behavior profile may include, for example, determined access patterns to protected resources by a particular user. A determined access pattern may be, for example, that a particular user only accesses a particular protected resource using a particular client device, with a particular context (e.g., at a particular geographic location at particular times) during particular days of the week. Data processing system 200 may utilize user behavior profiles 236 to help verify a particular user's identity prior to allowing access to a protected resource.

Resource table 222 is a listing of all resources protected by data processing system 200. Resource table 222 includes resource identifiers 238 and resource values 240. Resource identifiers 238 represent a plurality of different resource identifiers that correspond to a plurality of different protected resources. Data processing system 200 utilizes resource identifiers 238 to uniquely identify each of the plurality of different protected resources.

Resource values 240 represent a plurality of different resource values that correspond to the plurality of different protected resources. Data processing system 200 may associate a resource value to each of the different protected resources. However, it should be noted that more than one protected resource may have the same resource value. A resource value represents a worth, a level of importance, or a level of sensitivity of a particular resource. For example, the higher the resource value corresponding to a particular protected resource, the more important the corresponding protected resource may be to an enterprise, organization, institution, or governmental agency.

Estimated risk values 224 represent a plurality of different estimated risk values that corresponds to a level of risk associated with accessing the plurality of different protected resources based on a context of each particular resource access request. A risk is a calculated negative impact of a user accessing one or more protected resources. Data processing system 200 may determine the context of each particular resource access request from information contained within each access request. For example, the context information included in a particular access request may include an identification of the client device requesting access to a particular protected resource and a geographic location of the client device at the time of the access request. The geographic location of the client device at the time of the access request may be determined via a geographic location device, such as, for example, geographic location device 128 of client 114 in FIG. 1.

Communications unit 210, in this example, provides for communication with other data processing systems or devices. Communications unit 210 may provide communications through the use of either or both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user. In addition, display 214 may provide touch screen capabilities.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206. These instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 242 is located in a functional form on computer readable media 244 that is selectively removable and may be loaded onto or transferred to data processing system 200 for running by processor unit 204. Program code 242 and computer readable media 244 form computer program product 246. In one example, computer readable media 244 may be computer readable storage media 248 or computer readable signal media 250. Computer readable storage media 248 may include, for example, an optical or magnetic disc that is inserted or placed into a drive or other device that is part of persistent storage 208 for transfer onto a storage device, such as a hard drive, that is part of persistent storage 208. Computer readable storage media 248 also may take the form of a persistent storage, such as a hard drive, a thumb drive, or a flash memory that is connected to data processing system 200. In some instances, computer readable storage media 248 may not be removable from data processing system 200.

Alternatively, program code 242 may be transferred to data processing system 200 using computer readable signal media 250. Computer readable signal media 250 may be, for example, a propagated data signal containing program code 242. For example, computer readable signal media 250 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 242 may be downloaded over a network to persistent storage 208 from another device or data processing system through computer readable signal media 250 for use within data processing system 200. For instance, program code stored in a computer readable storage media in a server data processing system may be downloaded over a network from the server to data processing system 200. The data processing system providing program code 242 may be a server computer, a client computer, or some other device capable of storing and transmitting program code 242.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 248 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that earlier risk-based access control policies were relatively simple and for many practical application scenarios these simple access control policies lacked sufficient flexibility to describe the complex tradeoff and interaction between the value of a protected resource being requested by a user, the trust associated with the user requesting access to the protected resource, and the context of the access request. These earlier risk-based access control policies lumped together resource value, user trust value, and context of the access request into one risk value. Such a risk value could be associated with many different user requests having very different combinations of resource values, user trust values, and risk values associated with the context of the access request. In addition, the flexibility in specifying a risk-based access control policy is restricted, which in turn limits how much flexibility the risk-based access control policy is able to provide.

Illustrative embodiments provide a trust/value/risk-based access control policy that separates the user trust value, the resource value, and the estimated risk value associated with the context of the resource access request into three distinct components. For a particular access request, illustrative embodiments utilize the risk associated with the particular access request, which is quantitatively estimated from the context of the particular access request, to modulate the trust value associated with the requesting user. Then, illustrative embodiments utilize the modulated user trust value and the resource value associated with the requested protected resource to generate an access control decision. By separating the user trust value, the resource value, and the estimated risk value associated with the context of the resource access request, illustrative embodiments enable more flexibility in specifying resource access control policies. Also, because illustrative embodiments estimate the risk associated with a user accessing a protected resource from the context of the resource access request, the trust/value/risk-based access control policy is a context-aware resource access control policy. Consequently, illustrative embodiments are able to modulate or adjust the user trust value associated with a particular user based on the context of the resource access request made by that particular user.

Illustrative embodiments determine the context of a resource access request by examining information associated with the resource access request that may be considered relevant to network security regarding protected resources, such as, for example, a physical geographic location of a client device associated with a user requesting access to a protected resource, a level of security corresponding to the physical geographic location of the client device, a time of day when the resource access request was made, a user behavior profile corresponding to the user requesting access to the protected resource, a level of security corresponding to the client device utilized by the user requesting access to the protected resource, a resource access history log corresponding to the user requesting access to the protected resource, and the like. As a result, the trust/value/risk-based access control policy of illustrative embodiments is a flexible resource access control policy that is context-aware and context-adaptive.

Further, by separating the resource value associated with a protected resource from the user trust value associated with the user requesting access to the protected resource within the trust/value/risk-based access control policy, illustrative embodiments are able to handle resource access requests during emergency situations. An emergency situation is a condition that requires immediate handling and immediate resolution, such as, for example, when an online service is provided, payment for that provided service is due. In an emergency situation, illustrative embodiments may increase the modulated user trust value associated with the user requesting access to a protected resource to address the urgent need. Alternatively, illustrative embodiments may lower the resource value associated with the protected resource to allow access to the protected resource during the emergency, thus decreasing the importance of the requested protected resource.

Thus, illustrative embodiments base resource access control decisions on the resource value associated with the requested protected resource and the user trust value associated with the user requesting access to the protected resource. It should be noted that the user trust value associated with the user requesting access to the protected resource changes with the resource value associated with the requested protected resource. For example, in most cases, the user trust value decreases as the resource value increases, with the exception of emergencies.

The user trust value also is affected by the context of the resource access request. For example, a user requesting access to a protected resource may be trustworthy (e.g., have a high user trust value associated with the user), but the user is utilizing a client device in a geographic location that has a low security level so that the requested protected resource, such as a sensitive document, is more likely to be compromised if access to the requested protected resource is granted. This means that the resource access request carries a higher risk value than if the user were in a more secure location so that the user trust value associated with the user for this particular resource access request will be reduced according to the estimated risk. As another example, the user authentication subsystem may not have high confidence level that the user requesting access to a protected resource is who the user claims to be. In this case, the uncertainty regarding the identity of the user results in a higher estimated risk value. As a further example, the user requesting access to a protected resource may have already been given access to a high number of protected resources within a short period of time. Consequently, a higher risk exists to let the user access yet another protected resource due to the possibility that more protected resources will be disclosed if the accessing device is lost, stolen, or otherwise compromised.

All these cases above indicate that some level of risk exists and illustrative embodiments will reduce the user trust value associated with the user requesting access to a protected resource according to the estimated risk associated with the context of the resource access request. The effective modulated user trust value associated with the user is not only determined by the resource value associated with the requested protected resource, but also is affected by the context of the resource access request, which is unique for each request. The trust/value/risk-based access control policy of illustrative embodiments is able to deal with and adapt to dynamically changing contexts, which change from request to request.

As a result, illustrative embodiments decouple resource values, user trust values, and estimated risk values. Illustrative embodiments quantitatively estimate the risk value from the context associated with the resource access request and modulate the user trust value associated with the user requesting access to a protected resource based on the estimated risk value. Illustrative embodiments then generate a resource access control decision based on the resource value associated with the requested protected resource and the modulated user trust value. Consequently, the trust/value/risk-based access control policy of illustrative embodiments is flexible in the sense that the policy is context-aware and context-adaptive. By quantitatively estimating the risk from the context of a resource access request, illustrative embodiments account for dynamic context changes without enumerating all possible contexts.

The trust/value/risk-based access control policy model of illustrative embodiments may include a plurality of different modules. For example, the model may include a module that specifies the user trust value associated with a user for different resource values, assuming a secure context, such as the user being in a secure location with a well-known access device having a known secure configuration. It should be noted that the user trust value is a value that is dependent upon the resource value of a requested protected resource. For example, the user trust value usually decreases as the resource value of a requested protected resource increases.

The trust/value/risk-based access control policy model also may include a module that modulates the user trust value based on the estimated risk value. The model also may include a module that assigns a resource value to each of the protected resources. Further, the model also may include a module that adjusts the user trust value or the resource values of protected resources during emergency situations. Either the modulated user trust value increases or the resource value decreases. Furthermore, the model may include a module that maps <modulated user trust value, resource value> tuples to a resource access control decision. It should be noted that this mapping may be independent of the user's identity requesting access to a protected resource. In addition, it should be noted that either the modulated user trust value or the resource value may have been adjusted in an emergency situation. The policy model also may need a risk estimate from a risk estimator module. However, it should be noted that the risk estimator module may not be included in the policy model.

The trust/value/risk-based access control policy needs data inputs directly or indirectly from a plurality of data sources. For example, the policy may receive input from a risk estimator to provide a risk estimate associated with a particular resource access request. The policy also may receive, for each user, a mapping from a resource value associated with a requested protected resource by a user to a user trust value associated with the user for the resource value. The policy also may receive a mapping from a requested protected resource to its associated resource value. For each requested protected resource, the mapping is a mechanism that quantifies the protected resource's value, importance, or sensitivity. This mapping mechanism may be a static mapping mechanism, such as a database table. Alternatively, the mapping mechanism may be implemented in a computational way using a document classifier that computes a value of a protected document resource from metadata corresponding to the document and/or content of the document. In addition, the resource value may be acquired from information contained within the resource access request, such as a monetary value of a bank transaction (e.g., a funds transfer). Further, the policy also may receive input from a module that in an emergency situation adjusts either the modulated user trust value associated with a user requesting access to a protected resource or the resource value associated with the requested protected resources. An enterprise typically relaxes resource access control so that personnel of the enterprise can quickly access the protected resources to handle an emergency. This emergency adjuster module may be an identity function whose input and output are the same if the enterprise does not want to handle an emergency in this manner.

With reference now to FIG. 3, a diagram illustrating a resource access control system is depicted in accordance with an illustrative embodiment. Resource access control system 300 may be implemented in a computer, such as server 104 in FIG. 1 or data processing system 200 in FIG. 2. Resource access control system 300 may include a plurality of different modules or software components. For example, resource access control system 300 includes request receptor module 302, resource to value mapping module 304, user to trust mapping module 306, risk estimator module 308, user trust value adjuster module 309, user trust value modulator module 310, emergency resource value adjuster module 312, and policy engine 314. However, it should be noted that resource access control system 300 may include more or fewer modules than shown. In other words, resource access control system 300 may add one or more modules not shown, combine two or more modules that are shown, split modules into two or more other modules, and the like.

When resource access control system 300 receives resource access request 316, resource access control system 300 generates a resource access decision to determine whether a requested access to a protected resource, such as protected resource 116 in FIG. 1, is granted, denied, or mitigation is required. In this example, resource access request 316 includes user identification 318, resource identification 320, and context of resource access request 322. However, it should be noted that resource access request 316 may include any data or information needed by the different illustrative embodiments.

Resource access control system 300 utilizes request receptor module 302 to receive resource access request 316 from a client device connected to a network, such as client 110 connected to network 102 in FIG. 1. Request receptor module 302 extracts the resource identification from resource access request 316 and inputs extracted resource identification 324 into resource to value mapping module 304. Resource to value mapping module 304 determines resource value 330, which is associated with resource identification 324 that corresponds to the requested protected resource. If resource access control system 300 handles resource access request 316 as an emergency, then resource access control system 300 utilizes emergency resource value adjuster module 312 to receive emergency value 336 for adjusting (i.e., decreasing) resource value 330 of the requested protected resource accordingly to generate adjusted resource value 338. However, it should be noted that emergency value 336 may be a zero (0) value, which means that resource value 330 and adjusted resource value 338 would be the same value based on a zero emergency value.

In addition, request receptor module 302 extracts the user identification from resource access request 316 and inputs extracted user identification 326 into user to trust mapping module 306. User to trust mapping module 306 determines how much "trust" is placed on the user requesting access to the protected resource based on the value of the requested protected resource. In other words, user to trust mapping module 306 determines resource-dependent trust value associated with user 332 and then inputs resource-dependent trust value associated with user 332 into user trust value adjuster module 309. User trust value adjuster module 309 adjusts resource-dependent trust value associated with user 332 using emergency value 336 to generate adjusted user trust value 333. User trust value adjuster module 309 outputs adjusted user trust value 333 into user trust value modulator module 310.

Further, request receptor module 302 extracts context information 328 from resource access request 316 and inputs extracted context of resource access request 328 into risk estimator module 308. Risk estimator module 308 estimates the risk associated with resource access request 316 based on context of resource access request 328. Risk estimator module 308 generates estimated risk 334 and inputs estimated risk 334 into user trust value modulator module 310.

User trust value modulator module 310 modulates adjusted user trust value 333 based on estimated risk 334 to generate modulated user trust value 340. User trust value modulator module 310 inputs modulated user trust value 340 into policy engine 314. Afterward, policy engine 314 maps the inputted <modulated user trust value 340, adjusted resource value 338> tuple to an access control decision based on a trust/value/risk-based access control policy, such as trust/value/risk-based access control policy 218 in FIG. 2. Then, policy engine 314 sends resource access control decision output 342 to the access enforcement point. The access enforcement point may be located on a client, a server, or in part on the client and in part on the server. Resource access control decision output 342 may be a decision to allow access by the user to the requested protected resource, a decision to deny access by the user to the requested protected resource, or a decision to mitigate access risk using a risk mitigation measure in order to allow the request. It should be noted that resource access control system 300 may adjust either resource value 330 or modulated user trust value 340 during an emergency situation.

In this example, resource access control system 300 represents resource-dependent trust value associated with user 332 as a mapping, such as (resource value dependent user trust value associated with a particular user)=ValueDependentTrust$_{user}$ (resource value). It should be noted that user to trust mapping module 306 does not have adjusted resource value 338 as an input and that user trust value modulator module 310 modulates the entire ValueDependentTrust$_{user}$ mapping. Policy engine 314 then utilizes adjusted resource value 338 and the modulated ValueDependentTrust$_{user}$ mapping (i.e., modulated user trust value 340) as input to generate resource access control decision output 342.

As an alternative illustrative embodiment, user to trust mapping module 306 may receive resource value 330 as input so that the user to trust mapping will produce a user trust value instead of the ValueDependentTrust$_{user}$ mapping. Consequently, user trust value modulator module 310 modulates this user trust value. Policy engine 314 utilizes adjusted resource value 338 and modulated user trust value 340 as input to generate resource access control decision output 342.

Resource access control system 300 sets up the trust/value/risk-based access control policy by implementing a plurality of steps. For example, resource access control system 300 may first assess and assign a resource value to each resource protected by resource access control system 300. These resource values do not have to be a set value, such as, for example, a monetary value, but also may be a unit-less utility number or a sensitivity level. This resource value assignment may be a mapping, such as, for example, resource value=ResourceValue(resource identifier). For each requested protected resource, the mapping is a mechanism that quantifies the protected resource's value or sensitivity level. This mechanism may be a static mapping, such as, for example, a database table. Alternatively, resource access control system 300 may implement the mechanism in a computational way, such as, for example, using a document classifier to compute the resource value of a protected document from metadata corresponding to the document and/or content of the document. In addition, resource access control system 300 may acquire the resource value from information contained within the resource access request, such as, for example, the monetary value of a funds transfer in a banking transaction. However, it should be noted that illustrative embodiments do not depend on any particular kind of resource valuation or resource valuation mechanism.

Second, resource access control system 300 may specify resource-dependent trust value associated with user 332 for each user as a mapping, such as, for example, (resource value dependent user trust value associated with a user)=ValueDependentTrust$_{user}$(resourcevalue). Resource access control system 300 may implement the ValueDependentTrust$_{user}$ mapping in many different ways. Two examples may be a database table and a mathematical function. Other implementations also are possible. It should be noted that illustrative embodiments do not depend on any specific mapping from resource value associated with the requested protected resource to user trust value associated with the user requesting access to the protected resource nor do illustrative embodiments depend on any specific implementation of the mapping.

Third, resource access control system 300 may specify/implement a risk estimator, such as risk estimator module 308. Risk estimator module 308 produces a quantified risk estimate based on the context of a resource access request, such as context of resource access request 328. For example, Risk Estimate=RiskEstimator(context of a resource access request). It should be noted that illustrative embodiments do not depend on any specific risk estimator.

Fourth, resource access control system 300 may specify/implement a user trust modulator, such as user trust value modulator module 310, which modulates the trust value associated with a user based on the risk estimate from the risk estimator, such as estimated risk 334 from risk estimator module 308. For example, (Modulated Trust)=TrustModulator(resource value dependent user trust value associated with user, risk quantitatively estimated from the context associated with a resource access request). It should be noted that illustrative embodiments do not depend on any specific user trust modulator.

Fifth, resource access control system 300 may specify/implement a resource value adjustor, such as emergency resource value adjuster module 312, to adjust (i.e., decrease) resource values associated with requested protected resources in an emergency. It should be noted that illustrative embodiments do not depend on any particular resource value adjustor. Also, the resource value adjustor may be an identity function. In other words, the resource adjustor does not adjust the resource values. As an alternative to the resource value adjustor, illustrative embodiments may utilize a user trust value adjustor that adjusts (i.e., increases) the modulated user trust value, such as modulated user trust value 340 in an emergency.

Sixth, resource access control system 300 may specify/implement several different options for resource access control decisions. Typically, resource access control system 300 may implement resource access control decision options, such as allow, deny, and mitigate. However, it should be noted that a specific trust/value/risk-based access control policy may include its own set of decision options.

The mitigation option may include a broad range of options, such as, for example, generate additional user authentication challenges to verify user identity, redact protected resource content to reduce the resource value at risk, delete protected resource content currently available to the user on a client device, send a request to the user to change the context of the resource access request, such as request user to change geographic location and/or change client device, and other risk mitigation strategies. Resource access control system 300 may utilize these mitigation options individually or in combination. However, it should be noted that illustrative embodiments do not depend on any specific set of resource access control decision options.

Seventh, resource access control system 300 may specify/implement a resource access control policy as a mapping, such as, for example, PolicyMapping(value of requested protected resource, value of user trust associated with user requesting access to the protected resource)=(a resource access control decision option). The resource access control decision option is one of those options listed above. A typical mapping/policy would consist of IF ... THEN rules such as, for example, IF user trust value is in range $rt_1$ AND resource value is in range $rval_1$, THEN resource access control decision=option $opt_i$; ELSE IF user trust value is in range $rt_2$ AND resource value is in range $rval_2$, THEN resource access control decision=option $opt_j$; ELSE resource access control decision=$opt_{default}$. IF ... THEN rules are not the only way to specify a mapping/policy. For example, resource access control system 300 may specify a policy as a mathematical function $f$, among other possibilities. The mathematical function may be, for example, Decision=$f$ (user trust value, resource value). However, it should be noted that illustrative embodiments do not depend on any specific way to specify or implement such a mapping.

Eighth, resource access control system 300 may specify/implement a receptor of resource access requests, such as request receptor module 302. An example implementation is a reverse proxy server that accepts resource access requests. In addition, the resource access request receptor also may coordinate and/or perform user authentication, authorization, and resource access control enforcement. It should be noted that illustrative embodiments do not depend on any specific kind of resource access request receptor.

Figure 4:
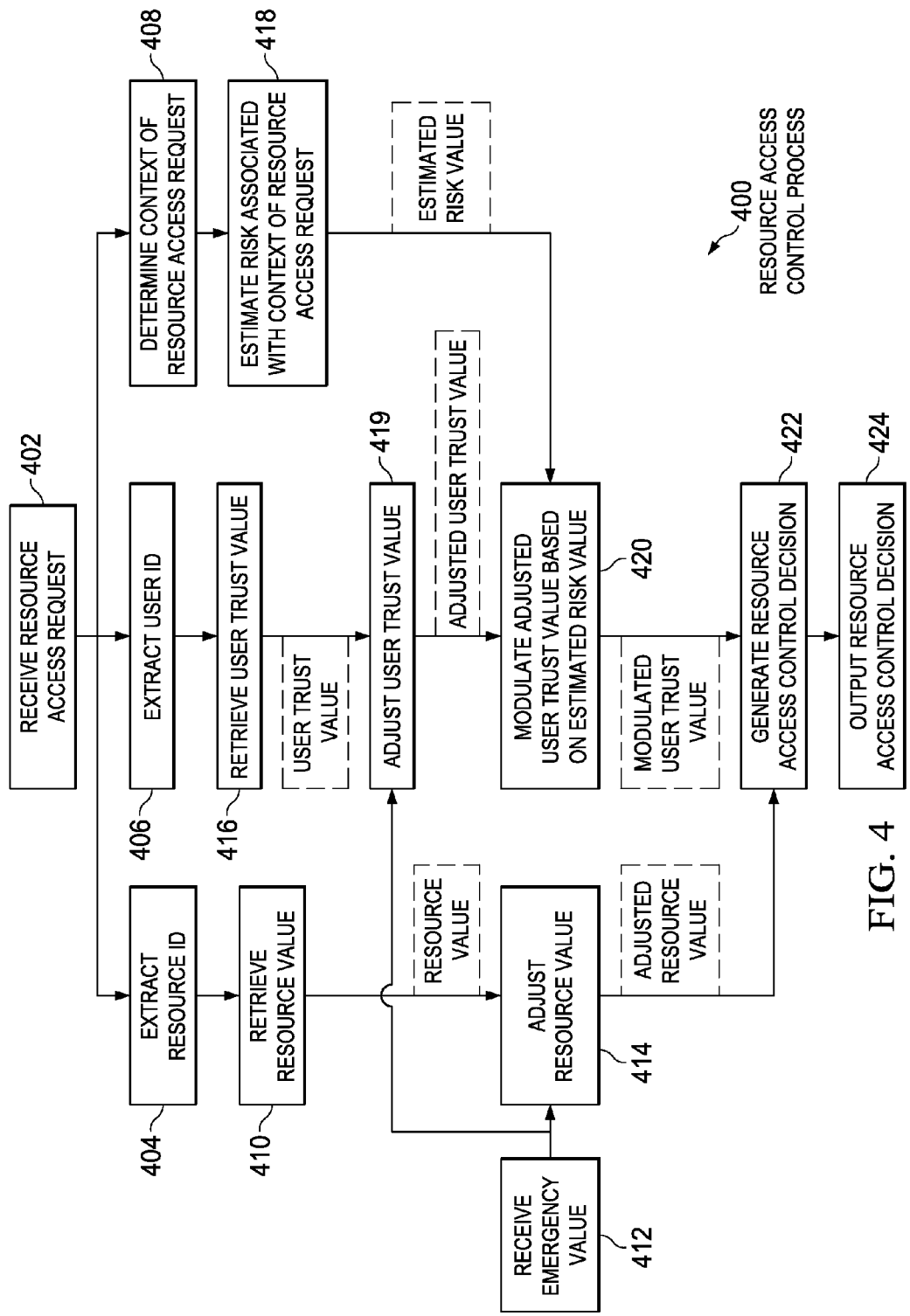
FIG. 4 is a diagram illustrating a resource access control process in accordance with an illustrative embodiment.

With reference now to FIG. 4, a diagram illustrating a resource access control process is depicted in accordance with an illustrative embodiment. Resource access control process 400 may be implemented in a computer, such as server 104 in FIG. 1 or data processing system 200 in FIG. 2. Resource access control process 400 begins by receiving a resource access request to a protected resource, such as protected resource 116 in FIG. 1, at 402. The resource access request may be received from, for example, a client device connected to a network, such as client 110 connected to network 102 in FIG. 1. The resource access request may be, for example, resource access request 316 in FIG. 3. Then, resource access control process 400 extracts a resource identifier associated with the requested protected resource from the resource access request at 404, extracts a user identifier associated with the user requesting access to the protected resource from the resource access request at 406, and determines a context of the resource access request from context information corresponding to the resource access request at 408.

Afterward, resource access control process 400 retrieves a resource value corresponding to the extracted resource identification at 410 and receives an emergency value at 412. Resource access control process 400 adjusts the resource value at 414 based on the retrieved resource value and the received emergency value to generate an adjusted resource value. However, it should be noted that the emergency value may be a zero value. In other words, if the received emergency value at 412 is a zero value, then the adjusted resource value is equal to the retrieved resource value at 410.

In addition, resource access control process 400 retrieves a user trust value corresponding to the extracted user identifier at 416 and estimates a risk value associated with a context of the resource access request at 418. Further, resource access control process 400 adjusts the retrieved user trust value based on the received emergency value at 419. Furthermore, resource access control process 400 modulates the adjusted user trust value based on the estimated risk value at 420. Then, resource access control process 400 generates a resource access control decision based on the adjusted resource value and the modulated user trust value at 422. Subsequently, resource access control process 400 outputs the resource access control decision to the client device via the network at 424.

Figure 5:
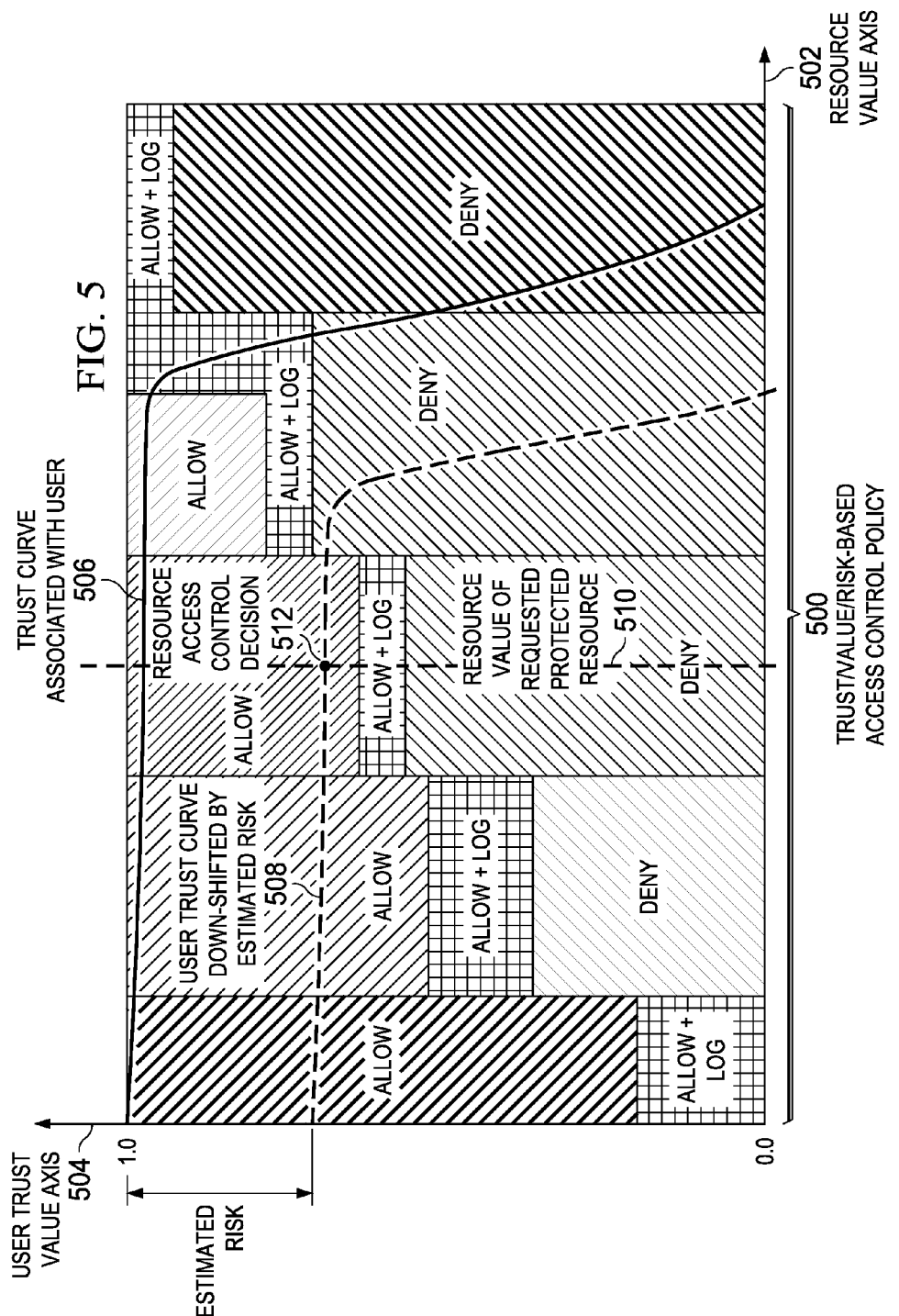
FIG. 5 is a diagram illustrating a trust/value/risk-based access control policy in accordance with an illustrative embodiment.

With reference now to FIG. 5, a diagram illustrating a trust/value/risk-based access control policy is depicted in accordance with an illustrative embodiment. Trust/value/risk-based access control policy 500 may be, for example, trust/value/risk-based access control policy 218 in FIG. 2. In addition, trust/value/risk-based access control policy 500 may be implemented in a computer, such as server 104 in FIG. 1 or data processing system 200 in FIG. 2.

In this example, trust/value/risk-based access control policy 500 is depicted as a plurality of decision boxes placed along resource value axis 502 and user trust value axis 504. Each decision box within the plurality of decision boxes placed along resource value axis 502 and user trust value axis 504 includes a decision, such as, for example, a decision to allow access by a user to a protected resource, a decision to allow access by a user to a protected resource and log, and a decision to deny access by a user to a protected resource. The protected resource may be, for example, protected resource 116 in FIG. 1. A decision to allow access by a user to a protected resource and log is a decision to allow the user access to the protected resource, but also the mitigation response is to log events associated with the access, such as, for example, name and identifier of the user, name and identifier of the protected resource accessed by the user, actions taken by the user while accessing the protected resource, date and time of access, et cetera. However, it should be noted that trust/value/risk-based access control policy 500 may include other decisions, such as, for example, defer decision to a higher authority.

Trust/value/risk-based access control policy 500 defines the user trust value associated with a particular user using trust curve associated with user 506. Further, trust/value/risk-based access control policy 500 may adjust a resource value associated with a requested protected resource by horizontally shifting the plurality of decision boxes along resource value axis 502. A horizontal shift of the plurality of decision boxes to the left along resource value axis 502 results in a decrease of a resource value of a protected resource. Similarly, a horizontal shift of the plurality of decision boxes to the right along resource value axis 502 results in an increase of a resource value of a protected resource. It should be noted that horizontally shifting the decision boxes along resource value axis 502 is mathematically equivalent to horizontally shifting trust curve associated with user 506 in an opposite direction by a same amount.

Trust/value/risk-based access control policy 500 modulates the user trust value associated with a user requesting access to a protected resource by down-shifting trust curve associated with user 506 based on the estimated risk, such as user trust curve down-shifted by estimated risk 508. The decision box where user trust curve down-shifted by estimated risk 508 (i.e., the modulated user trust curve) intersects with resource value of requested protected resource 510 provides resource access control decision 512. In this example, resource access control decision 512 is a decision to allow access to the requested protected resource by the user.

Figure 6B:
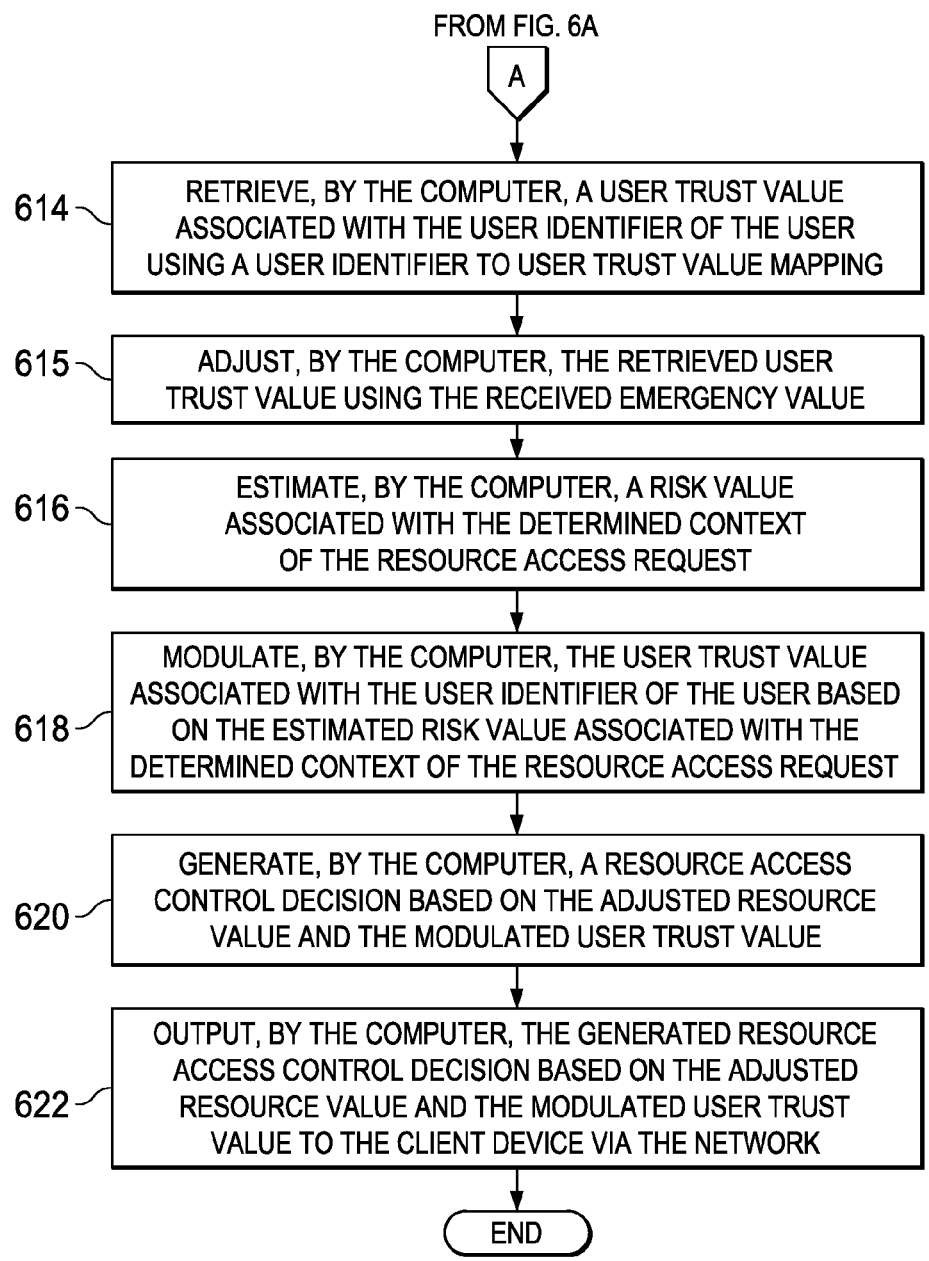

With reference now to FIGS. 6A-6B, a flowchart illustrating a process for managing access control of a protected resource is shown in accordance with an illustrative embodiment. The process shown in FIGS. 6A-6B may be implemented in a computer, such as, for example, server 104 in FIG. 1 or data processing system 200 in FIG. 2.

The process begins when the computer receives a resource access request to a protected resource that includes a resource identifier of the protected resource, a user identifier of a user associated with the resource access request, and resource access context information from a client device via a network (step 602). The protected resource may be, for example, protected resource 116 in FIG. 1. The client device may be, for example, client 110 in FIG. 1. The network may be, for example, network 102 in FIG. 1. The resource access request that includes the resource identifier of the protected resource, the user identifier of the user associated with the resource access request, and the resource access context information may be, for example, resource access request 316 that includes user identifier 318, resource identifier 320, and context of resource access request 322 in FIG. 3.

Subsequently, the computer extracts the resource identifier of the protected resource and the user identifier of the user, such as resource identifier 324 and user identifier 326 in FIG. 3, from the resource access request (step 604). In addition, the computer determines a context of the resource access request, such as context of resource access request 326 in FIG. 3, from the resource access context information included in the resource access request (step 606). Further, the computer retrieves a resource value, such as resource value 330 in FIG. 3, associated with the resource identifier of the protected resource using a resource identifier to resource value mapping (step 608). The computer also receives an emergency value, such as emergency value 336 in FIG. 3, associated with the resource access request (step 610).

Afterward, the computer adjusts the resource value, such as adjusted resource value 338 in FIG. 3, associated with the resource identifier of the protected resource using the received emergency value associated with the resource access request (step 612). In addition, the computer retrieves a user trust value, such as resource-dependent trust value associated with user 332 in FIG. 3, associated with the user identifier of the user using a user identifier to user trust value mapping (step 614). Furthermore, the computer adjusts the retrieved user trust value using the received emergency value (step 615). However, it should be noted that step 615 may be an alternative to step 612. In other words, different illustrative embodiments may adjust the retrieved user trust value instead of the retrieved resource value. The computer also estimates a risk value, such as estimated risk 334 in FIG. 3, associated with the determined context of the resource access request (step 616).

Then, the computer modulates the user trust value, such as modulated user trust value 340 in FIG. 3, associated with the user identifier of the user based on the estimated risk value associated with the determined context of the resource access request (step 618). Further, the computer generates a resource access control decision based on the adjusted resource value and the modulated user trust value (step 620). Subsequently, the computer outputs the generated resource access control decision, such as resource access control decision output 342 in FIG. 3, based on the adjusted resource value and the modulated user trust value to the client device via the network (step 622). Thereafter, the process terminates.

Thus, illustrative embodiments provide a computer-implemented method, computer system, and computer program product for generating a resource access control decision based on an adjusted resource value associated with a protected resource and a modulated user trust value associated with a user requesting access to the protected resource. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for generating a resource access control decision, the computer-implemented method comprising:

adjusting, by a computer, a resource value associated with a resource identifier of a protected resource using an emergency value associated with a resource access request;

modulating, by the computer, a user trust value associated with a user identifier of a user requesting access to the protected resource based on an estimated risk value associated with a context of the resource access request; and generating, by the computer, the resource access control decision based on the adjusted resource value associated with the protected resource and the modulated user trust value associated with the user requesting access to the protected resource.

2. The computer-implemented method of claim 1, further comprising:
outputting, by the computer, the generated resource access control decision to an enforcement point associated with the user requesting access to the protected resource, wherein the generated resource access control decision is one of a decision to allow access by the user to the protected resource, a decision to deny access by the user to the protected resource, or a decision to mitigate access risk using a risk mitigation measure.

3. The computer-implemented method of claim 2, wherein the risk mitigation measure includes at least one of generation of additional user authentication challenges to verify identity of the user, redaction of protected resource content to reduce the resource value, deletion of redacted resource content available to the user on a client, and sending a request to the user to change the context of the resource access request by changing at least one of geographic location and client context to mitigate risk.

4. The computer-implemented method of claim 1, further comprising:
adjusting, by the computer, the user trust value associated with the user requesting access to the protected resource using an emergency value associated with the resource access request;
modulating, by a computer, the adjusted user trust value associated with the user requesting access to the protected resource based on the estimated risk value associated with the context of a resource access request; and
generating, by the computer, the resource access control decision based on the modulated adjusted user trust value associated with the user requesting access to the protected resource.

5. The computer-implemented method of claim 1, further comprising:
receiving, by the computer, the resource access request that includes the resource identifier of the protected resource, the user identifier of the user requesting access to the protected resource, and context information identifying the context of the resource access request from a client.

6. The computer-implemented method of claim 5, further comprising:
extracting, by the computer, the resource identifier of the protected resource and the user identifier of the user from the resource access request.

7. The computer-implemented method of claim 5, further comprising:
determining, by the computer, the context of the resource access request from the context information included in the resource access request.

8. The computer-implemented method of claim 1, further comprising:
retrieving, by the computer, the resource value associated with the resource identifier of the protected resource using a resource identifier to resource value mapping; and
retrieving, by the computer, the user trust value associated with the user identifier of the user using a user identifier to user trust value mapping.

9. The computer-implemented method of claim 1, wherein the context of the resource access request includes at least one of a geographic location of a client associated with the user requesting access to the protected resource, a level of security corresponding to the geographic location of the client, a time of day when the resource access request was made, a user behavior profile corresponding to the user requesting access to the protected resource, a level of security corresponding to the client utilized by the user requesting access to the protected resource, a resource access history log corresponding to the user requesting access to the protected resource, and a number of protected resources and their corresponding resource values the user currently has access to.

10. The computer-implemented method of claim 1, wherein the computer utilizes a trust/value/risk-based access control policy to determine the resource access control decision, and wherein the trust/value/risk-based access control policy separates the resource value associated with the protected resource, the user trust value associated with the user requesting access to the protected resource, and the estimated risk value associated with the context of the access request into three distinct components.

11. The computer-implemented method of claim 1, wherein the computer assigns a resource value to each protected resource in a plurality of protected resources protected by the computer.

12. A computer system for generating a resource access control decision, the computer system comprising:
a bus system;
a storage device connected to the bus system, wherein the storage device stores computer readable program code; and
a processor unit connected to the bus system, wherein the processor unit executes the computer readable program code to:
adjust a resource value associated with a resource identifier of a protected resource using an emergency value associated with a resource access request;
modulate a user trust value associated with a user identifier of a user requesting access to the protected resource based on an estimated risk value associated with a context of the resource access request; and
generate the resource access control decision based on the adjusted resource value associated with the protected resource and the modulated user trust value associated with the user requesting access to the protected resource.

13. A computer program product stored on a computer readable storage medium having computer readable program code encoded thereon that is executable by a computer for generating a resource access control decision, the computer program product comprising:
computer readable program code to adjust a resource value associated with a resource identifier of a protected resource using an emergency value associated with a resource access request;
computer readable program code to modulate a user trust value associated with a user identifier of a user requesting access to the protected resource based on an estimated risk value associated with a context of the resource access request; and
computer readable program code to generate the resource access control decision based on the adjusted resource value associated with the protected resource and the modulated user trust value associated with the user requesting access to the protected resource.

14. The computer program product of claim 13, further comprising:
computer readable program code to output the generated resource access control decision to an enforcement point associated with the user requesting access to the protected resource, wherein the generated resource access control decision is one of a decision to allow access by the user to the protected resource, a decision to deny access by the user to the protected resource, or a decision to mitigate access risk using a risk mitigation measure.

15. The computer program product of claim 14, wherein the risk mitigation measure includes at least one of generation of additional user authentication challenges to verify identity of the user, redaction of protected resource content to reduce the resource value, deletion of redacted resource content available to the user on a client, and sending a request to the user to change the context of the resource access request by changing at least one of geographic location and client context to mitigate risk.

16. The computer program product of claim 13, further comprising:
 computer readable program code to adjust the user trust value associated with the user requesting access to the protected resource using an emergency value associated with the resource access request;
 computer readable program code to modulate the adjusted user trust value associated with the user requesting access to the protected resource based on the estimated risk value associated with the context of a resource access request; and
 computer readable program code to generate the resource access control decision based on the modulated adjusted user trust value associated with the user requesting access to the protected resource.

17. The computer program product of claim 13, further comprising:
 computer readable program code to receive the resource access request that includes the resource identifier of the protected resource, the user identifier of the user requesting access to the protected resource, and context information identifying the context of the resource access request from a client.

18. The computer program product of claim 17, further comprising:
 computer readable program code to extract the resource identifier of the protected resource and the user identifier of the user from the resource access request.

19. The computer program product of claim 17, further comprising:
 computer readable program code to determine the context of the resource access request from the context information included in the resource access request.

20. The computer program product of claim 13, further comprising:
 computer readable program code to retrieve the resource value associated with the resource identifier of the protected resource using a resource identifier to resource value mapping; and
 computer readable program code to retrieve the user trust value associated with the user identifier of the user using a user identifier to user trust value mapping.

* * * * *